W. R. HEPNER & E. M. VAN DYKE.
SPEAR.
APPLICATION FILED JULY 11, 1912.

1,076,036.

Patented Oct. 21, 1913.

WITNESSES

INVENTORS
W. R. Hepner
E. M. Van Dyke
By H. L. Woodward
Attorney

UNITED STATES PATENT OFFICE.

WALTER R. HEPNER AND ELBERT M. VAN DYKE, OF KALISPELL, MONTANA.

SPEAR.

1,076,036.   Specification of Letters Patent.   Patented Oct. 21, 1913.

Application filed July 11, 1912. Serial No. 708,764.

*To all whom it may concern:*

Be it known that we, WALTER R. HEPNER and ELBERT M. VAN DYKE, citizens of the United States, residing at Kalispell, in the county of Flathead and State of Montana, have invented new and useful Improvements in Spears, of which the following is a specification.

This invention relates to fishermen's equipment, and more particularly to spear heads or harpoons, and has for its object to provide a mechanical barb operable to spring from the sides of the spear head or tine after passing a predetermined distance within the body of a fish to hold it against escape from the spear.

It is an object also to enable the ready operation of the device to allow the disengagement thereof from a fish.

It is a further object to provide against the casual action of the barb.

An additional object is to present a simple construction of such a device whereby it may be manufactured easily and at a low cost.

Figure 1:
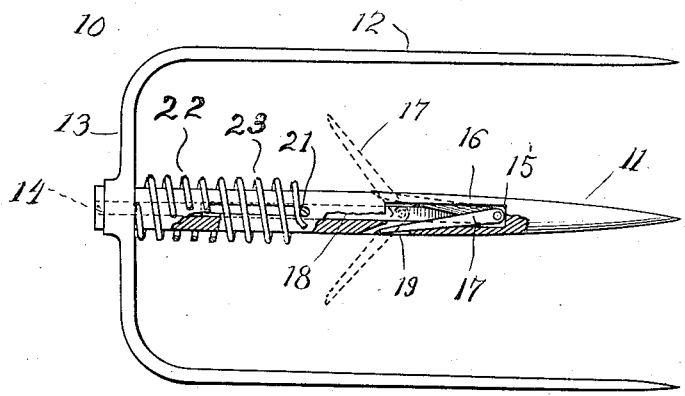
Figure 2:
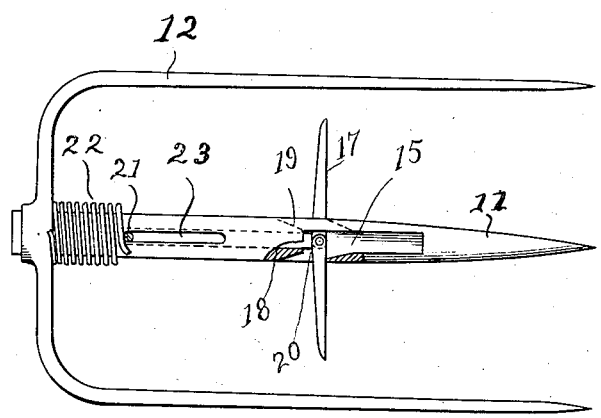
Figure 3:
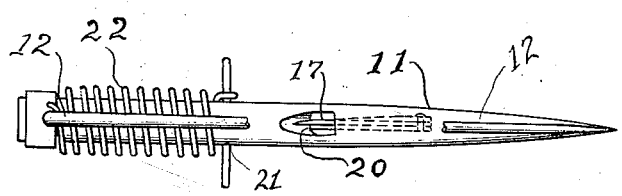
Figure 4:

Other objects and advantages will be apparent from the following description and from the drawings, in which, Figure 1 is a side view of the device partly in section, closed, Fig. 2 is a similar view showing it opened, Fig. 3 is an edge view Fig. 4 is a detail of the barb.

There is illustrated a trident head 10 adapted or adaptable to be mounted on any form of shank, and including the heavy central tine 11 and the two lighter side tines 12 all springing from a transverse head piece 13. The central tine 11 is axially bored from its upper or inner end, as at 14 to the barb chamber 15, which is slightly enlarged and located intermediately of the length of the tine. The chamber 15 is open on one side for a part or all of its length, as at 16 whereby the barbs 17 may be readily disposed therein and secured to the inner end of a stem or link 18 slidable in the bore 14. At each side of the tine 11 barb ports 19 are formed extending from the chamber 15 diagonally toward the base of the tine. The inner edge of the side of the port that is nearest the base of the tine is spaced longitudinally of said tine from the outer edge of the side of said port farthest from the base of the tine as at 20, whereby the barbs may project at right angles to the stem 18 when at the inner limit of their movement. The barbs are secured pivotally to the stem in any convenient manner.

The opening 16 of the chamber 15 preferably extends its full length to allow the device to be readily cleaned, and it may be found possible to spring the stem into the passage or bore 14 through this opening, in which case the bore need not extend to the inner end of the tine, although it would probably be most conveniently formed that way. The barbs may be secured upon the stem after the latter is put in position, or if the stem is presented through the opening 16, might be attached before and inserted at the same time with the stem. Their length is such that when the stem engages the outer end of the chamber 15, the points of the barbs lie slightly beyond the junctions of the ports with the chamber.

Inwardly of the ports 19 toward the head 13, there are formed two longitudinally extending slots 23 at opposite sides of the tine, and engaged through the stem there is a cross bar 21 projecting through the slots and beyond the periphery of the tine a distance suitable for engagement against the side of a fish or other animal into which the spear is thrown, to force the barbs inwardly on the tine 11 and outwardly through the ports 19 to the position shown in Fig. 2. At this position the barbs engage the inner end of the chamber 15 at their bases, and a short distance outwardly thereof are held by the outer edges of the ports 19 against swinging forwardly. The bar 21 is preferably located a distance inwardly of the points of the barbs when in fully retracted position, so that they will have passed well into the body of an animal before opening.

As the spear is thrown the inertia of the stem and barbs might tend to move them to open position if left loosely in the tine, and for this reason, if desired some slight retarding means may be employed to hold them yieldably against opening movement, such as the spring 22 confined between the head 13 and the bar 21. This spring should be much lighter and weaker proportionately than shown.

In use, when the spear is thrown, it will enter the body engaged until the surface thereof engages the bar 21, which may be enlarged at its outer ends to insure its proper action; and continuing, the bar will be moved inwardly carrying the stem 18 and moving the barbs to open position as dotted in Fig. 1, where they will remain until the spear is fully embedded. The barbs are then free to swing outwardly to the position illustrated in Fig. 2 under any tendency of the spear to become disengaged, whereby it is securely held in the body. It will be seen that under such tendency or action, the barbs will engage unbroken flesh and their action be made most efficient. For the disengagement of the spear without damage to the flesh of the animal other than the wounds of the tines 11 and 12, the bar 21 is forcibly pressed against the side of the body of the animal by the fingers, or the toe of a boot, and the spear at the same time drawn outwardly.

What is claimed is:

1. A device of the general character described, comprising a penetrating member, a longitudinally reciprocable stem carried thereby, barbs pivoted on the stem toward the outer end of the penetrating member, means on the member adapted to engage and hold the barbs in closed position when the stem is at the outer limit of its movement, means to engage and bear the barbs outwardly under inward movement of the stem, and a projecting portion on the stem to engage a body penetrated, for opening of the barbs.

2. A device of the class described comprising a head a penetrating tine, a longitudinally reciprocable member thereon resilient means to hold the member at the outer limit of its movement, means on the member to engage the surface of a penetrated body to move the member inward, and barbs outwardly of said means connected pivotally to the reciprocable member, and means to engage the barbs for opening movement under inward movement of the reciprocable member and for closing of the barbs under outward movement thereof, on the tine.

In testimony whereof we have hereunto set our hands in presence of two subscribing witnesses.

WALTER R. HEPNER.
ELBERT M. VAN DYKE.

Witnesses:
H. S. McElroy,
Fred S. Perry.